(12) United States Patent  (10) Patent No.: US 7,989,720 B2
Adcock et al.  (45) Date of Patent: Aug. 2, 2011

(54) SMART CABLE FOR CONTROLLING VIDEO CAPTURE DEVICE

(75) Inventors: John Adcock, Menlo Park, CA (US); Laurent Denoue, Palo Alto, CA (US); David M. Hilbert, Palo Alto, CA (US); Matthew Cooper, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1612 days.

(21) Appl. No.: 11/324,859

(22) Filed: Jan. 4, 2006

(65) Prior Publication Data

US 2007/0153128 A1 Jul. 5, 2007

(51) Int. Cl.
*H04N 5/268* (2006.01)

(52) U.S. Cl. .......... 200/51.09; 200/51.11; 200/51.12; 348/446; 348/790; 348/705

(58) Field of Classification Search ............ 200/51 R, 200/51.09, 51.11, 51.12; 348/446, 705, 790
See application file for complete search history.

(56) References Cited

U.S. PATENT DOCUMENTS

| 5,727,191 | A | 3/1998 | Konishi et al. | 395/507 |
| 6,373,476 | B1 | 4/2002 | Dalgleish et al. | 345/204 |
| 6,452,615 | B1 | 9/2002 | Chiu et al. | 345/776 |
| 7,319,490 | B2 * | 1/2008 | Kanamori et al. | 348/375 |
| 2003/0061607 | A1 * | 3/2003 | Hunter et al. | 725/32 |
| 2007/0002168 | A1 * | 1/2007 | Vasquez et al. | 348/446 |
| 2007/0070258 | A1 * | 3/2007 | Kinoshita et al. | 348/790 |
| 2008/0030615 | A1 * | 2/2008 | Vasquez et al. | 348/446 |

OTHER PUBLICATIONS

Erol et al., "Lining Presentation Documents Using Image Analysis"; Abstract; Ricoh Innovations Inc., California Research Center; 5 pages.
Girgensohn et al., "Video Classification Using Transform Coefficients"; Abstract; FX Palo Alto Laboratory; 4 pages.
Vesa; "Enhanced Display Data channel Standard"; Mar. 24, 2004; Video Electronics Standards Association; mhtml:http://www.vesa.org/summary/sumeddc.mht; last visit Apr. 4, 2005; 8 pages.
Vesa; "Display Data Channel Command Interface Standard"; Oct. 29, 2004; Video Electronics Standards Association; mhtml:http://www.vesa.org/summary/sumeddcdi.mht; last visit Apr. 4, 2005; 10 pages.
"Mediasite™"; Sonic Foundry: Mediasite; http://www.sonicfoundry.com/systems/mediasite.asp; last visit Apr. 4, 2005 2 pages.
Peter Ziewer, "Navigational Indices and Full-Text Search by Automated Analyses of Screen Recorded Data"; Department of Computer Science; Technical University of Munich, Germany; 8 pages.

* cited by examiner

*Primary Examiner* — Gary F. Paumen
(74) *Attorney, Agent, or Firm* — Morgan, Lewis & Bockius LLP

(57) ABSTRACT

An element, such as a plug on a VGA cable, can communicate with a media storage unit to enable or disable media storage.

27 Claims, 2 Drawing Sheets

SMART CABLE FOR CONTROLLING VIDEO CAPTURE DEVICE

BACKGROUND OF THE INVENTION

The present invention relates generally to systems for storing media presentations.

DESCRIPTION OF THE RELATED ART

Slide presentations, especially computer generated slide presentations, are becoming more and more important in business and academia. Typically, a large number of presentations are given at corporations and colleges that would contain a lot of useful information if it were available to colleagues. It is therefore desirable to archive slide images and other media used in presentations.

One way of doing this is to use software that interacts with the slide presentation software. This additional software can obtain and store the slide images and other media of a presentation for later use. A problem with this type of solution is that it may restrict the type of slide presentation software and computer operating system that can be used. This type of solution would also have to be loaded onto all of the presenter's laptops and thus may be a burden for the presenters.

SUMMARY OF THE INVENTION

One embodiment of the present invention uses an element, such as a plug on a video cord, to control the storage of media that is displayed on a display device. This can ensure that a user consents to the storage of the displayed media.

The element can be connected to a presentation device to provide a video signal to a display device. The element can include a switch with an on-state and an off-state. When the switch is in the on-state, storage of media from the presentation device is enabled. When the switch is in the off-state, storage of media from the presentation device is disabled. When the switch is in the off state this does not disable the display of the media by the display device.

BRIEF DESCRIPTION OF THE DRAWINGS

Preferred embodiments of the present invention will be described in detail based upon the following figures, wherein.

DETAILED DESCRIPTION

Figure 1A:
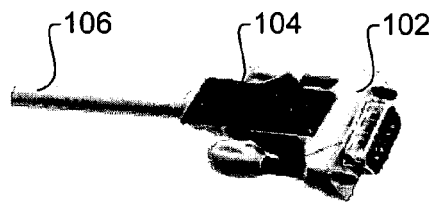
FIG. 1A is a diagram of an element, of one embodiment, that can be used to control a media storage unit.
Figure 1B:
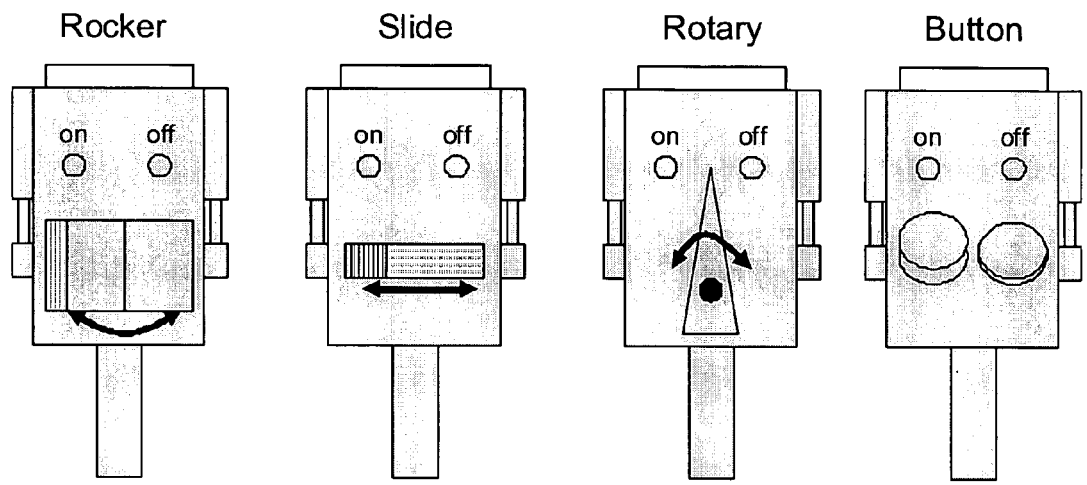
FIG. 1B is a diagram of alternate examples of control elements with switches.
Figure 2:
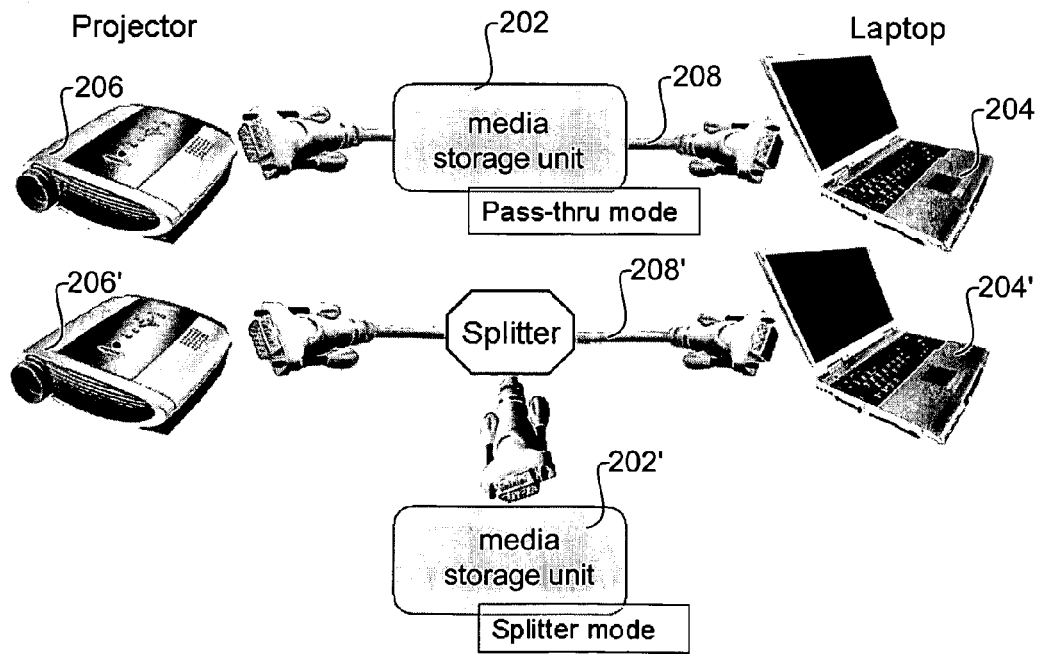
FIG. 2 is a diagram of media storage unit systems of one embodiment.

FIG. 2 is a diagram of media storage unit systems of one embodiment. A display device 206 and 206', such as a projector, can receive presentation information, such as a video signal of a display screen, from a presentation device 204 and 204', such as a laptop. The presentation information can be sent using a video cable 208 and 208', such as a VGA cable. A media storage device 202 and 202' can copy media obtained from the video cable. The media storage unit can be in-line with the display device (pass through mode) or parallel with the display device (splitter mode).

In one embodiment, the media storage device can be used to capture, index and manage presentation media, such as slides and audio streams. With the presenter's permission, the system can capture presentation media without any software requirements and unnecessary user interactions since a video stream is captured. The video capture can be paired with subsequent analyzing technology such as optical character recognition (OCR) technologies. A system based on a video stream capture can be independent of the presenter device hardware or software. Once the presentations have been captured, users can search and browse using the resulting archive to locate content of interest. Slide images can be reused within organization and cohesive textual representation and presentation context can be available for accurate retrieval, translation, or recommendation services. A web user interface can be used to allow user to search, replay and export captured content.

A media storage unit can record visual material displayed on a computer screen by way of a video cable, such as a VGA cable. The source of video can be a computer, such as a laptop, connected to the VGA cable. A laptop user may desire to prevent the content he plans to display from being captured by the media storage unit. To accommodate this desire, an element, which can be part of, or associated with, the cable, can contain a physical interface by which the user may choose to enable or disable the recording process. In one embodiment, the interface can require an explicit choice by the user to enable or disable the media storage, can communicate to the media storage unit using the video cable, and can provide visual feedback of the current recording status.

Privacy is a common concern with media storage, so some affordance for enabling or disabling the recording can be provided. In one embodiment, the media storage unit connects to the presentation device only through the VGA cable. Therefore an interaction system that can take advantage of this connection has advantages. Another desired characteristic of the recording switch is that it makes the user aware of the current recording status. By making the switch integral to a VGA cable, the user will naturally handle the recording control to use the system. In one embodiment, the cable end is designed in such a way as to require the user to make a choice vis-à-vis recording to use the cable at all.

One embodiment of the present invention is an element 102 adapted to transfer a video signal. The element 102 can be connected to a presentation device to provide a video signal to a display device. The element 102 can include a switch 104 with an on-state and an off-state. When the switch is in the on-state, storage of media from the presentation device can be enabled. When the switch is in the off-state, storage of media from the presentation device can be disabled. In one embodiment, when the switch in the off state this does not disable the display of the media by the display device.

Figure 3:
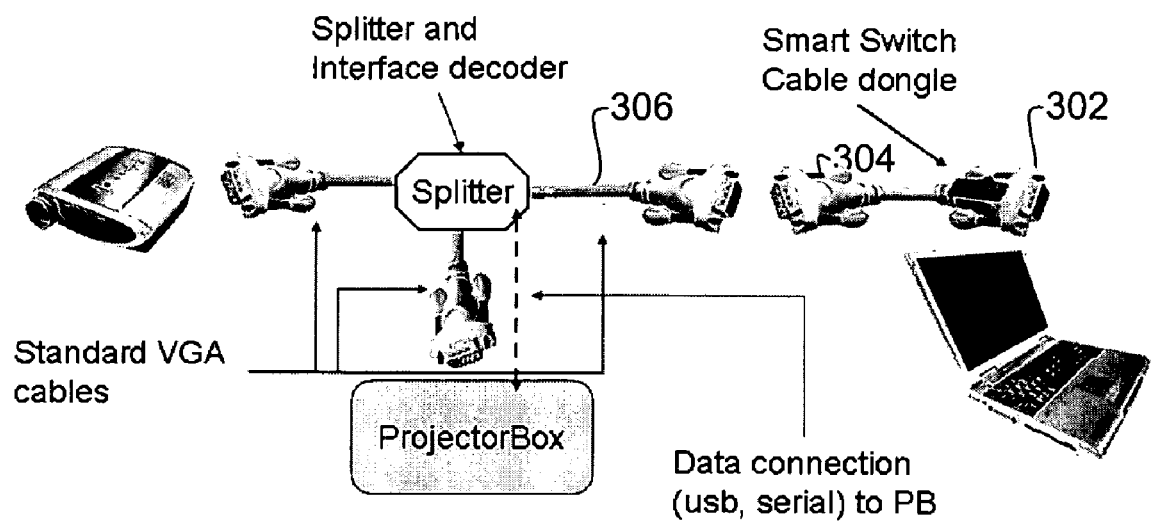
FIG. 3 is a diagram of a system of one embodiment.

The element 102 can be part of a video cable, such as a plug of a video cable. The video cable with the element can interconnect the presentation device to the display device. Alternately, the element can connect to a video cable. FIG. 3 shows an example where element 302 is on a short video cable (dongle) 304 that connects to video cable 306.

The element can include a display to indicate a state of the element. The display can be an LED, LCD or any type of display. The switch can change state when the element is unplugged.

The switch state can be encoded mechanically, electronically or manually. Manual switches can be used with an on position and off position.

There can be more than one on-state. For example, one on-state can enable recording video and audio while the other on-state doesn't enable recording audio.

The switch can have a default state. The switch can return to the default state after use. In one embodiment, the switch must be switched from the default state for the element, such as a plug, to be attached to the presentation device. The default can be an on-state, an off-state or a neutral potion. The switch can have a spring or other element that switches the state when unplugged. The media storage can be enabled and disabled at a media storage unit. The media storage unit can detect an indication sent from the element. For example, the media storage unit can detect a line, such as a color line, being grounded to determine whether to store the media. The element can transfer an indication of the switch state using one or more lines, such as color line, of the video cable cord. Alternately, the media storage unit can examine an image to determine whether to store the media.

In one embodiment of the present invention, a video cable comprises a video cable cord 106 and a plug 102 attached to the video cable cord. The plug is adapted to be connected to a presentation device to provide a video signal to a display device. The plug 102 can include a switch 104 with an on-state and an off-state. When the switch is in the on-state, storage of media from the presentation device can be enabled. When the switch is in the off-state, storage of media from the presentation device can be disabled. In one embodiment, the switch 104 in the off state does not disable the display of the media by the display device.

Figure 4:
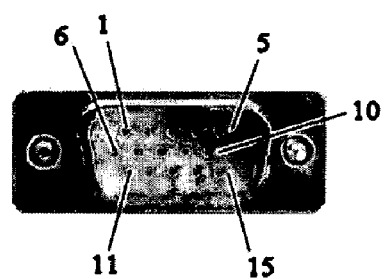
FIG. 4 is a diagram of the pins of a VGA cable.

FIG. 4 and Table 1 shows details of VGA cable that can be used in one embodiment of the present invention.

| 1: | 2: | 3: | 4: | 5: |
|---|---|---|---|---|
| *Red video* | *Green video* | *Blue video* | Monitor ID2 | *Ground* |
| 6: | 7: | 8: | 9: | 10: |
| *Red Ground* | *Green ground* | *Blue ground* | <u>+5V</u> | *Sync ground* |
| 11: | 12: | 13: | 14: | 15: |
| Monitor ID0 | <u>DDCDAT/</u> Monitor ID1 | *Horizontal Sync* | *Vertical Sync* | <u>DDCClock/</u> |

Table 1 shows exemplary VGA pin assignments. Text in italics corresponds to pin assignments that are common to all VGA cables. Underlined text denotes assignments in the VESA DDC specification. Plaintext denotes pin assignments in the Monitor ID detection scheme.

Exemplary Embodiments

Opt-In and Opt-Out Behaviors

A variety of interface behaviors can be implemented:
1. Last-choice: the switch remains in the position it was last set to until explicitly changed.
2. Opt-in(out): when unplugged, the switch reverts to off (on) and requires that the user choose to enable(disable) recording when the cable is attached to a computer.
3. Forced-opt: when unplugged the switch reverts to a neutral position and requires that the user choose to enable or disable recording when the cable is attached to a computer.

Behavior #1 is the simplest design since the switch needs not reset itself on unplugging (types 2 and 3), nor provide a physical method to block the use of the VGA plug when no choice has been made (type 3)

Power

The VESA DDC standard specifies pin #9 to be +5 volts. This power can be used to run a low-power communication circuit or LED display on our smart cable. Alternatively, one of the Monitor ID/DDC cables can be powered from the Media Storage unit. At the computer-connection end of the cable this line would not be passed-thru.

Communication Path

Wires existing in standard VGA cables can be used for communication without interrupting the normal operation of the cable.

Electrical Signaling When Unplugged

The element, such as a plug, can be designed in such a way as to use the video cable for communication with the media storage unit when the element is not connected to a computer. In one embodiment, the user only changes the recording status when the cable is unplugged since the media storage unit communication channel is disabled when a computer is attached. A variety of ways can be used by the switch to detect when the display adapter is attached—either with a physical switch that is depressed by the act of plugging into a computer, or an electrical circuit that can detect the change in impedance between pins when plugged into a video adapter, or detect the presence of the sync signal. In this signaling method any of the lines on the VGA cable can be used, including the color lines, since the signaling only takes place while the display is inactive (there is no sync signal).

Visual Signaling

An alternative signaling method is to have the switch pull one or more of the color lines to ground momentarily to communicate with the media storage unit. In this method the video capture card itself can detect the action of the switch by analyzing the captured image.

In one embodiment, a sequence of captured images can be examined. When no green color is found this can be interpreted as a signal to turn recording off and when no red color is found this can be interpreted as a signal to turn the recording on. Other different signaling methods can be used. In one embodiment, the stamping is done multiple times to avoid connection errors. The element can send a sequence of values to avoid incorrect detection. In general the video capture card will rely upon the presence of the sync signals for proper operation, so the video adapter needs to be connected for this to function appropriately.

The combination of electrical signaling when unplugged, and visual signaling when plugged-in is also possible. In this fashion the switch itself can always operate on the color lines, and the media storage unit capture appliance can detect the action either electrically or visually and operate accordingly.

Electrical Signaling Through the Monitor ID Pins

With one monitor id detection scheme, VGA pins 4 (ID2), 11 (ID0), 12 (ID1), and 15 (ID3) can be used to inform the display card about the minimal capabilities of the attached display device. ID0-ID2 can be clamped to ground or left unconnected to indicate whether the attached monitor is color and if it can display at 1024×768 resolution as detailed in Table 2. By restricting the nature of the display device that may be attached, some of these communication lines can be re-used for media storage unit communication while still adhering to the standard ID scheme. For instance, if the option of a monochrome monitor can be foregone, then pin 12 can be permanently made no-connection at the computer end and subsequently used by the media storage unit for communication.

TABLE 2

Monitor ID detection codes.

| Pin 4/<br>ID2 | Pin 11/<br>ID0 | Pin 12/<br>ID1 | Meaning |
|---|---|---|---|
| NC | NC | NC | No Monitor |
| NC | NC | GND | Monochrome, no 1924 × 768 |
| NC | GND | NC | Color, no 1024 × 768 |
| GND | GND | NC | Color, 1024 × 768 |

Electrical Signaling Through the DDC Standard Pins

A variety of Video Electronics Standards Association (VESA) standards exist for unidirectional and bidirectional communication between display adapters and display devices. These standards are collectively known as Display Data Channel (DDC) standards. These standards were designed to allow a display device, such as a monitor, to communicate its capabilities to a display adapter, and to allow a display adapter to configure parameters of the display device. These data transmission protocols operate over standardized VGA cables. In one embodiment, the standard communication channel provided by this protocol can be co-opted for use by our interface. That is, the smart switch can send a message to the media storage unit using the VESA standard protocols, but carrying a signal intended for the media storage unit. The media storage unit can intercept this message and interpret it appropriately. Similarly, the media storage unit can send messages which the switch can decode. Depending on the need to support the VESA link between the host computer and the actual display device, the switch and the media storage unit can allow standard DDC information to pass through unaltered.

The foregoing description of preferred embodiments of the present invention has been provided for the purposes of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its partial application, thereby enabling others skilled in the art to understand the invention for various embodiments and with various modifications that are suited to the particular use contemplated. It is intended that the scopes of the invention are defined by the claims and their equivalents.

The invention claimed is:

1. An element adapted to transfer a video signal, the element adapted to be connected to a presentation device to provide the video signal to a display device, the element including a switch with an on-state and an off-state, wherein, when the switch is in the on-state, storage of media from the presentation device is enabled and, when the switch is in the off-state, storage of media from the presentation device is disabled, and wherein the switch in the off state does not disable the display of the media by the display device.

2. The element of claim 1, wherein the element is part of a video cable.

3. The element of claim 1, wherein the element is a plug of a video cable.

4. The element of claim 1, wherein the element connects to a video cable.

5. The element of claim 1, wherein the element includes a display to indicate a state of the element.

6. The element of claim 1, wherein the switch state is encoded mechanically.

7. The element of claim 1, wherein the switch state is encoded electronically.

8. The element of claim 1, wherein the switch is operated manually.

9. The element of claim 1, wherein the switch changes to a default state when the element is unplugged.

10. The element of claim 1, wherein the switch must be switched from its default state for the element to be attached.

11. The element of claim 1, wherein the element transfers an indication of the switch state using one or more lines of the video cable cord.

12. The element of claim 1, wherein the storage is enabled and disabled at the media storage unit.

13. The element of claim 11, wherein the element sends an indication to the media storage unit.

14. The element of claim 11, wherein media storage unit detects a line of the video cable being grounded to determine whether to store the media.

15. The element of claim 11, wherein media storage unit examines an image to determine whether to store the media.

16. A video cable comprising:
a video cable cord; and
a plug attached to the video cable cord, wherein the plug is adapted to be connected to a presentation device to provide a video signal to a display device, the plug including a switch with an on-state and an off-state, wherein, when the switch is in the on-state, storage of media from the presentation device is enabled and, when the switch is in the off-state, storage of media from the presentation device is disabled, and wherein the switch in the off state does not disable the display of the media by the display device.

17. The video cable of claim 16, wherein the switch changes to a default state when the video cable cord is unplugged.

18. The video cable of claim 16, wherein the switch is operated manually.

19. The video cable of claim 16, wherein the video cable is a VGA cable.

20. The video cable of claim 16, wherein the plug indicates the switch state when the video cable cord is unplugged.

21. The video cable of claim 16, wherein the switch must be switched from its default state for the plug to be attached.

22. The video cable of claim 16, wherein the plug transfers an indication of the switch state using one or more lines of the video cable cord.

23. The video cable of claim 16, wherein the plug transfers an indication of the switch state using a DDC message.

24. The video cable of claim 16, wherein the storage is enabled and disabled at a media storage unit.

25. The video cable of claim 22, wherein media storage unit detects a line of the video cable being grounded to determine whether to store the media.

26. The video cable of claim 22, wherein media storage unit examines an image to determine whether to store the media.

27. The video cable of claim 22, wherein media storage unit examines a DDC message to determine whether to store media.

* * * * *